United States Patent Office.

GEORGE P. B. HILL, OF VIRGINIA CITY, NEVADA.

*Letters Patent No. 82,315, dated September 22, 1868.*

---

IMPROVED PROCESS OF EXTRACTING PRECIOUS METALS FROM ORES, &c.

---

*The Schedule referred to in these Letters Patent and making part of the same.*

---

TO ALL WHOM IT MAY CONCERN:

Be it known that I, GEORGE P. B. HILL, of Virginia City, county of Storey, State of Nevada, have invented an Improved Process for Extracting the Precious Metals from Ores, Tailings, and Slimes; and I do hereby declare that the ingredients used, with the best apparatus known to me for performing the said process, are described in the following specification.

The principal object of my invention is to extract the precious metals from the tailings and slimes from quartz-mills, that have heretofore been worked by other means. Yet crude ores, before they are amalgamated, are worked advantageously and profitably by my process and ingredients.

My invention consists in the employment of calcined or roasted sulphate of copper and calcined sulphate of iron, mixed with the pulp, tailings, or slimes in the proportions that I will hereafter describe.

To prepare the ingredients, I take sulphate of copper and sulphate of iron, and pulverize them separately, and lay them on iron plates or sheets, under which I place a fire and roast them, mixing the two together in the desired proportions during the operation of roasting, which is continued until a fine, light powder is produced. Considerable care should be taken to get the proportions correct, and the nature of the ore to be treated should be well understood. As, for instance, when there is much iron pyrites or sulphurets of iron in the ore, less sulphate of iron will be required in the treatment. So, also, where sulphurets of copper to a great extent are found in the ore, a less quantity of sulphate of copper will be required to be mixed with the sulphate of iron.

The quantity of ore to be treated should also be considered as nearly as possible. For treating the ores of the Comstock lead of Nevada, to which ores my experiments have been mostly confined, I would use, for treating ore for amalgamating, that would assay fifty ($50) dollars per ton, from one and one-half (1½) to two and one-half (2½) pounds calcined sulphate of copper, and from eight (8) to twelve (12) ounces calcined sulphate of iron, which are mixed with the pulp in the pans or barrels after having been worked with salt for a short time in the usual way.

In working tailings that would assay twenty ($20) dollars per ton, I would require from one (1) to two (2) pounds of calcined sulphate of copper, and from eight (8) to ten (10) ounces of calcined sulphate of iron.

Slimes are that part of the ore or pulp that remains after amalgamation, and what is called the mill-process for reducing the sulphurets, and those that would assay from thirty ($30) to forty ($40) dollars per ton, will require less of iron, because they have less of the baser metals remaining after having been subjected to the several treatments made mention of above, and I would use from one and a half (1½) to two and a half (2½) pounds of calcined sulphate of copper, and four to six ounces calcined sulphate of iron, following the same general manner of working now employed where my ingredients are not used.

Having thus described my invention, what I claim, and desire to secure by Letters Patent, is—

The ingredients above enumerated, mixed or compounded, and added to the ores, pulp, tailings, and slimes, in about the proportions herein specified for the purpose set forth.

In witness whereof, I have hereunto set my hand and seal.

GEO. P. B. HILL. [L. S.]

Witnesses:
C. W. M. SMITH,
J. L. BOONE.